J. C. PITEL.
Clock Escapement.
No. 32,144.
Patented April 23, 1861.
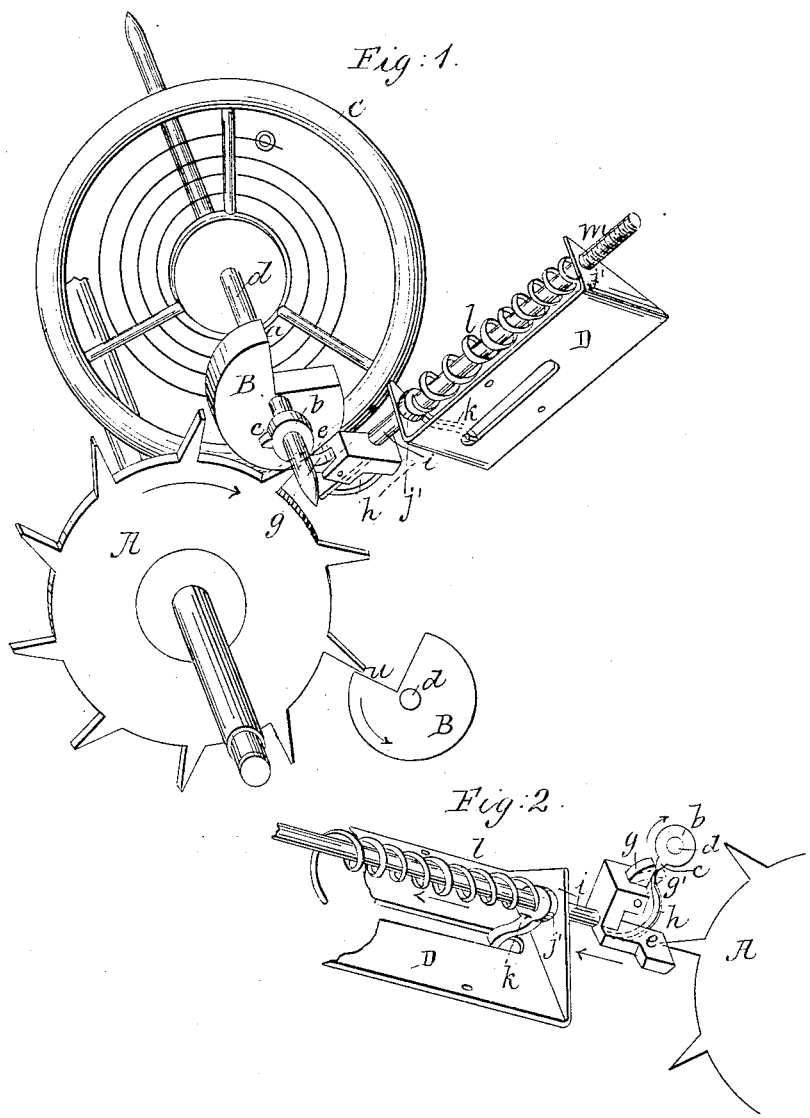

UNITED STATES PATENT OFFICE.

JOHN C. PITEL, OF WEST MERIDEN, CONNECTICUT.

CLOCK-ESCAPEMENT.

Specification of Letters Patent No. 32,144, dated April 23, 1861.

*To all whom it may concern:*

Be it known that I, JOHN C. PITEL, of West Meriden, in the county of New Haven and State of Connecticut, have invented a new and useful Improvement in Escapements for Clocks, &c.; and I do hereby declare that the following is a full, clear, and exact description of the construction, character, and operation of the same, reference being had to the accompanying drawings, which make part of this specification, in which—

Figure 1, is a perspective view of the parts of the escapement, showing their relative positions, &c. Fig. 2, is a perspective view of the detent, or pallet of repose, and the projecting point by means of which it is lifted, or moved, by the action of the lifting pallet.

My improvement consists in the manner of constructing, and operating, the detent, or repose pallet, by connecting with it a projecting point working on a joint pin in such a manner as to be unyielding in one direction, so that by the action of the lifting pallet upon it, the repose pallet will be lifted, or moved, sufficiently to release the point of the tooth of the crown, or scape, wheel, and allow the force of the mainspring to revolve the scape wheel so that the next tooth will come in contact with the main, or impulse, pallet; to give a vibratory motion, or impulse, to the balance, while the detent, or repose pallet, will be returned to its original position by a spring; and the lifting pallet, on its return, will be allowed to pass the projecting point, as that point will yield, (in that direction,) on its joint pin, and will be again restored to its place by a suitable spring.

I make the scape wheel, A, with the teeth, substantially, of the form, or shape, represented in Fig. 1. I make the collet, B, (a part of which forms the main, or impulse, pallet, as, *a*, Fig. 1) substantially, in the form shown in Fig. 1. I make the collet, *b*, which carries the lifting pallet, *c*, substantially, of the shape, or form, shown in Fig. 1. I make the detent, or repose pallet, *e*, substantially, of the shape, or form, represented in Fig. 2, and in connection with this detent, *e*, I have, attached by a joint pin, a suitable projecting point, as shown at *g*, Fig. 2, and also, (in parts in dots,) at *g*, Fig. 1, against which the lifting pallet, *c*, Fig. 1, strikes, as shown, (in the black line section,) at *c*, Fig. 2, to lift, or move, the detent, or repose pallet, *e*, in the direction indicated by the dart, so as to release the tooth of the scape wheel. And when the lifting pallet, *c*, returns, by the reverse vibration of the balance, C, the projecting point, *g*, will yield, in that direction, (on its joint pin,) and be forced back to the position indicated by dots, at *g′*, Fig. 2, and when the lifting pallet, *c*, has passed it, the spring, *h*, will return it to its place at *g*, ready for the next action. I attach this detent, or repose pallet, *e*, &c., to the end of a shaft, or bar, *i*, Figs. 1 and 2, which I have work in bearings, or ways, in an independent piece, D, as shown at *j, j*, Figs. 1 and 2. To this shaft, or bar, *i*, I attach a guide, as shown at *k*, Fig. 2, and indicated, by dots, in Fig. 1, to keep the shaft from turning. And, on this shaft, *i*, I fix a helical spring, *l*, which will instantly return the repose pallet, *e*, &c., whenever it has been removed by the action of the lifting pallet, *c*. The longitudinal movement of this shaft may be graduated by the guide, *k*, or by a nut on the outer end of the shaft, as at *m*.

Having made the several parts of the escapement, as before described, I secure the piece, D, to the clock plate in such a situation as to bring the repose pallet, *e*, &c., in the proper position to be acted on by the teeth of the scape wheel, A, as shown at *e*, Fig. 2, and, by the lifting pallet, *c*, as indicated in Fig. 2, and adjust the two collets, B and *b*, on the arbor, *d*, of the balance, C, substantially, in the relative positions shown in Fig. 1. I then apply the power of the mainspring to the train in the usual way, and communicate motion to the balance, C, (in the direction indicated by the dart,) which will cause the lifting pallet, *c*, to come in contact with the projecting point, *g*, (as indicated in Fig. 2,) and move the repose pallet, *e*, in the direction indicated by the dart, so as to release the tooth of the scape wheel, when the power of the main-spring will force the scape wheel forward, (in the direction indicated by the dart,) so that the next tooth will come in contact with the main, or impulse, pallet, *a*, as indicated (by the black line section,) in Fig. 1, and communicate impulse to the balance, C, (in the direction indicated by the dart,) and when the tooth passes from the main pallet, *a*, it will fall onto the repose pallet, e, as indicated, (by the black line section,) Fig. 2, the pallet, e, having been returned to its former position by the helical spring, l, and in the reverse vibration of the balance, C, the projecting point, g, will yield (on its joint pin) to the lifting pallet, c, as indicated by the dots, at g', Fig. 2, and when the pallet, c, has passed, the spring, h, will return the point, g, to its former position, ready for another operation.

This escapement may be used in every position, (as the spring, l, should always be made sufficient to readily overcome the gravity of the repose pallet and its appendages,) and it is of simple construction, not liable to get out of order, and not expensive.

What I claim as my invention, and desire to secure by Letters Patent, is—

The use of the detent, or repore pallet, (e,) and projecting point, (g,) in combination with a suitable lifting pallet, (as c,) when the whole is constructed, arranged and fitted to produce the result, substantially, as herein described.

JOHN C. PITEL.

Witnesses:
M. PETERSERS,
R. FITZGERALD.